United States Patent
Yamamoto

(10) Patent No.: US 8,023,027 B2
(45) Date of Patent: Sep. 20, 2011

(54) SOLID-STATE IMAGING DEVICE AND IMAGING APPARATUS UTILIZING A DYNAMIC BIAS CURRENT FOR REDUCED POWER CONSUMPTION

(75) Inventor: Jun Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 12/036,736

(22) Filed: Feb. 25, 2008

(65) Prior Publication Data

US 2008/0204822 A1    Aug. 28, 2008

(30) Foreign Application Priority Data

Feb. 27, 2007   (JP) .................. 2007-046497

(51) Int. Cl.
*H04N 3/14* (2006.01)
*H04N 5/335* (2006.01)

(52) U.S. Cl. ............... 348/308; 348/222.1; 348/300

(58) Field of Classification Search ........... 348/222.1, 348/300, 308; 250/208.1
See application file for complete search history.

(56) References Cited

U.S. PATENT DOCUMENTS

| | | | | |
|---|---|---|---|---|
| 6,665,012 | B1* | 12/2003 | Yang et al. | 348/308 |
| 2002/0100921 | A1* | 8/2002 | Mabuchi et al. | 257/222 |
| 2005/0062865 | A1* | 3/2005 | Shibazaki | 348/300 |
| 2005/0178950 | A1* | 8/2005 | Yoshida | 250/208.1 |
| 2008/0030595 | A1* | 2/2008 | Murakami et al. | 348/222.1 |
| 2010/0019127 | A1* | 1/2010 | Kagawa et al. | 250/208.1 |

FOREIGN PATENT DOCUMENTS

| | | |
|---|---|---|
| JP | 2000-236485 | 8/2000 |
| JP | 2001-257946 | 9/2001 |
| JP | 2002-209149 | 7/2002 |
| JP | 2003-234957 | 8/2003 |

OTHER PUBLICATIONS

A Japanese Office Action dated Dec. 10, 2008 issued in connection with counterpart Japanese Patent Application No. 2007-046497.

* cited by examiner

*Primary Examiner* — Gevell Selby
(74) *Attorney, Agent, or Firm* — SNR Denton US LLP

(57) ABSTRACT

A solid-state imaging device includes: a sensor unit; a vertical scanning unit and a horizontal scanning unit; column amplifier units provided at respective vertical signal lines corresponding to columns in the sensor unit and amplifying signal charges read out to the vertical signal lines; a bias current adjustment unit controlling current flowing in the vertical signal lines by changing bias current of the column amplifier units; a signal processing unit processing signal charges read out to the vertical signal lines and amplified at the column amplifier units into image signals to be outputted; an output unit to which signals outputted from the signal processing unit are supplied; a drive signal generation unit supplying drive signals to the vertical scanning unit, the horizontal scanning unit, the signal processing unit and the output unit; and an input unit supplying plural drive mode signals to the drive signal generation unit.

9 Claims, 6 Drawing Sheets

SOLID-STATE IMAGING DEVICE AND IMAGING APPARATUS UTILIZING A DYNAMIC BIAS CURRENT FOR REDUCED POWER CONSUMPTION

CROSS REFERENCE TO RELATED APPLICATIONS

The present invention contains subject matter related to Japanese Patent Application JP 2007-046497 filed in the Japanese Patent Office on Feb. 27, 2007, the entire contents of which being incorporated herein by reference.

BACKGROUND OF THE INVENTION

1. Field of the Invention

The invention relates to a solid-state imaging device applied to, for example, an image input system, and an imaging apparatus using the same.

2. Description of the Related Art

As an imaging apparatus using a solid-state imaging device, a digital camera, a PC camera, an optical mouse, a portable TV telephone and the like are developed in recent years. These apparatuses require low voltage and low power consumption from the point of increasing the battery operating time or miniaturization, in addition to from the point of image quality. Since a CCD sensor has difficulties in the above points, a MOS-type solid-state imaging device is often applied. The MOS-type solid-state imaging device has characteristics such as single power supply, lower power consumption, system-on-chip, and further has large degree of freedom in reading out. For example, it is possible to output only part of an image (cutting operation) or output image information discontinuously (thinning-out operation).

A MOS-type solid-state imaging device in related arts will be explained with reference to FIG. 6.

In FIG. 6, a MOS-type solid-state imaging device 1 includes a sensor unit 2 in which many unit pixels including photo diodes performing photoelectric conversion and MOS switches are arranged in a matrix state, a vertical scanning circuit 3 and a horizontal scanning circuit 4 driving the sensor unit 2, a CDS (Correlated Double Sampling)/signal holding circuit 5 receiving signals of a row of pixels in the sensor unit 2, an output amplifier 6, a timing generator circuit 7 generating pulses for operating respective units of the vertical scanning circuit 3, the horizontal scanning circuit 4, the CDS/signal holding circuit 5 and the output amplifier 6 and a serial interface 8 (refer to JP-A-2002-209149 (Patent Document 1)).

Vertical scanning lines 10 from the vertical scanning circuit 3 are commonly connected to pixels of respective rows in the sensor unit 2, and vertical scanning pulses φV [φV1, φV2, ... φVn] are simultaneously supplied from the vertical scanning circuit 3 to pixels of respective rows through the vertical scanning lines 10. Vertical signal lines 11 are commonly connected to pixels of respective columns in the sensor unit 2, and the respective vertical signal lines 11 are connected to a horizontal signal line 12 through the CDS/signal holding circuit 5. The horizontal signal line 12 is connected to the input side of the output amplifier 6. The horizontal scanning circuit 4 supplies horizontal scanning pulses φH[φH1, φH2, ... φHn] for selecting pixel signals from the CDS/signal holding circuit 5 and outputting them to the horizontal signal line 12 to horizontal switches of the CDS/signal holding circuit 5. Serial data is supplied to the serial interface 8 from the outside. A synchronizing signal and a clock signal are supplied to the serial interface 8 and the timing generator circuit 7 from the outside.

In the above CMOS-type solid-state imaging device 1, the serial interface 8 receives data from the outside, controlling the operation of the timing generator circuit 7 according to the data. The timing generator circuit 7 generates drive pulses for operating the vertical scanning circuit 3, the horizontal scanning circuit 4, the CDS/signal holding circuit 5 and the output amplifier 6 according to data, supplying them to respective units. The sensor unit 2 is scanned by the vertical scanning circuit 3, that is to say, rows of pixels are sequentially selected by the vertical selection pulses φV [φV1, φV2, ... φVn] from the vertical scanning circuit 3, and pixel signals in the selected (scanned) row are outputted to the CDS/signal holding circuit 5 through the vertical signal lines 11. The CDS/signal holding circuit 5 receives the signals of a row and holds the signals whose offset components peculiar to respective pixels (correspond to fixed-pattern noise components) are subtracted. Then, the horizontal switches are sequentially turned on by the horizontal scanning pulses φH [φH1, φH2, ... φHn] from the horizontal scanning circuit 4 and pixel signals of a row held in the CDS/signal holding circuit 5 are sequentially read out to the output amplifier 6 through the horizontal signal line 12. The signals are amplified in the output amplifier 6 to be outputted to an output terminal "t out" as analog signals.

SUMMARY OF THE INVENTION

The power consumption of the above MOS-type solid-state imaging device 1 is approximately a fifth part of the power consumption of the CCD solid-state imaging device. To mount the device on portable devices, it is necessary to further reduce the power consumption. There is a problem that, when the number of pixels increases and an output rate (that is, drive frequency of the horizontal scanning circuit) becomes high, the power consumption also increases.

Concerning the power consumption of the MOS-type solid-state imaging device, the power consumption in the pixel unit is one tenth or less as compared with the CCD pixels, therefore, it can be almost negligible. Even in digital parts (the serial interface 8, the timing generator circuit 7, the vertical scanning circuit 3, the horizontal scanning circuit 4 and the like), the power consumption is relatively low, and is the highest at the output amplifier 6 which is the analog circuit. Particularly, as the number of pixels increases, the drive frequency increases, therefore, the frequency characteristic of the output amplifier 6 have to be increased accordingly. In order to increase the frequency characteristic in the analog circuit, it is necessary that bias current flows a lot, which causes further increase of power consumption. When the number of pixels increases and the output rate becomes high, there is a problem that random noise in the output circuit also increases.

In related arts, a bias current adjustment unit adjusting bias current with respect to the output amplifier is provided, thereby realizing low power consumption in the output amplifier.

It is important to use a sensor which can make transfer at high speed such as a column ADC-type (circuit performing A/D conversion by each column) image sensor for increasing speed as compared with a column CDS-type image sensor in related arts. Though horizontal transfer of the column ADC-type image sensor is performed at high speed as it is digital transfer, vertical transfer thereof is analog transfer, therefore, the speed is reduced by settling in the column ADC. In order to increase the speed of analog vertical transfer, it is necessary to increase the current amount flowing in vertical signal lines to control stabilizing time (settling time) of signals to the minimum.

However, to increase the current amount causes the increase of power consumption, in addition, as the whole power consumption increases, an imaging chip has heat, heat current is generated and enters into photodiodes in the sensor unit to cause the increase of noise current (dark current).

Thus, it is desirable to provide a solid-state imaging device and the imaging apparatus using the same which realizes speed-up as well as reduction of noise, while controlling power consumption lower than the related arts by controlling current in vertical signal lines according to drive modes and switching the settling time.

According to an embodiment of the invention, a solid-state imaging device includes a sensor unit in which plural pixels are arranged, a vertical scanning unit and a horizontal scanning unit scanning pixels in the sensor unit, column amplifier units provided at respective vertical signal lines corresponding to columns in the sensor unit and amplifying signal charges read out to the vertical signal lines, a bias current adjustment unit controlling current flowing in the vertical signal lines by changing bias current of the column amplifier units, a signal processing unit processing signal charges read out to the vertical signal lines and amplified at the column amplifier units into image signals to be outputted, an output unit to which signals outputted from the signal processing unit are supplied, a drive signal generation unit supplying drive signals to the vertical scanning unit, the horizontal scanning unit, the signal processing unit and the output unit, and an input unit supplying plural drive mode signals to the drive signal generation unit, in which current flowing in the vertical signal lines is controlled by changing bias current supplied from the bias current adjustment unit to the column amplifier units by drive signals outputted from the drive signal generation unit according to the plural drive mode signals.

According to an embodiment of the invention, an imaging apparatus includes a solid-state imaging device imaging a subject, imaging optical system guiding incident light from the subject to the solid-state imaging device, a signal processing unit processing output signals from the solid-state imaging device, in which the solid-state imaging device has a sensor unit in which plural pixels are arranged, a vertical scanning unit and a horizontal scanning unit scanning pixels in the sensor unit, column amplifier units provided at respective vertical signal lines corresponding to columns in the sensor unit and amplifying signal charges read out to the vertical signal lines, a bias current adjustment unit controlling current flowing in the vertical signal lines by changing bias current of the column amplifier units, a signal processing unit processing signal charges read out to the vertical signal lines and amplified at the column amplifier units into image signals to be outputted, an output unit to which signals outputted from the signal processing unit are supplied, a drive signal generation unit supplying drive signals to the vertical scanning unit, the horizontal scanning unit, the signal processing unit and the output unit and an input unit supplying plural drive mode signals to the drive signal generation unit, and in which current flowing in the vertical signal lines is controlled by changing bias current supplied from the bias current adjustment unit to the column amplifier units by drive signals outputted from the drive signal generation unit according to the plural drive mode signals.

In a solid-state imaging device and an imaging apparatus using the same according to the embodiments of the invention, it is configured that bias current in the column amplifier units provided at respective columns in the sensor unit is changed by the bias current adjustment unit according to operation modes, thereby controlling the current amount flowing in vertical signal lines of respective columns to switch the settling time, as a result, low power consumption and speed-up can be realized at the same time as well as noise reduction can be possible.

DESCRIPTION OF THE PREFERRED EMBODIMENTS

First Embodiment

Hereinafter, a solid-state imaging device according to a first embodiment of the invention will be explained with reference to FIG. 1. The solid-state imaging device according to embodiments of the invention is not limited to the embodiment explained below.

Figure 1:
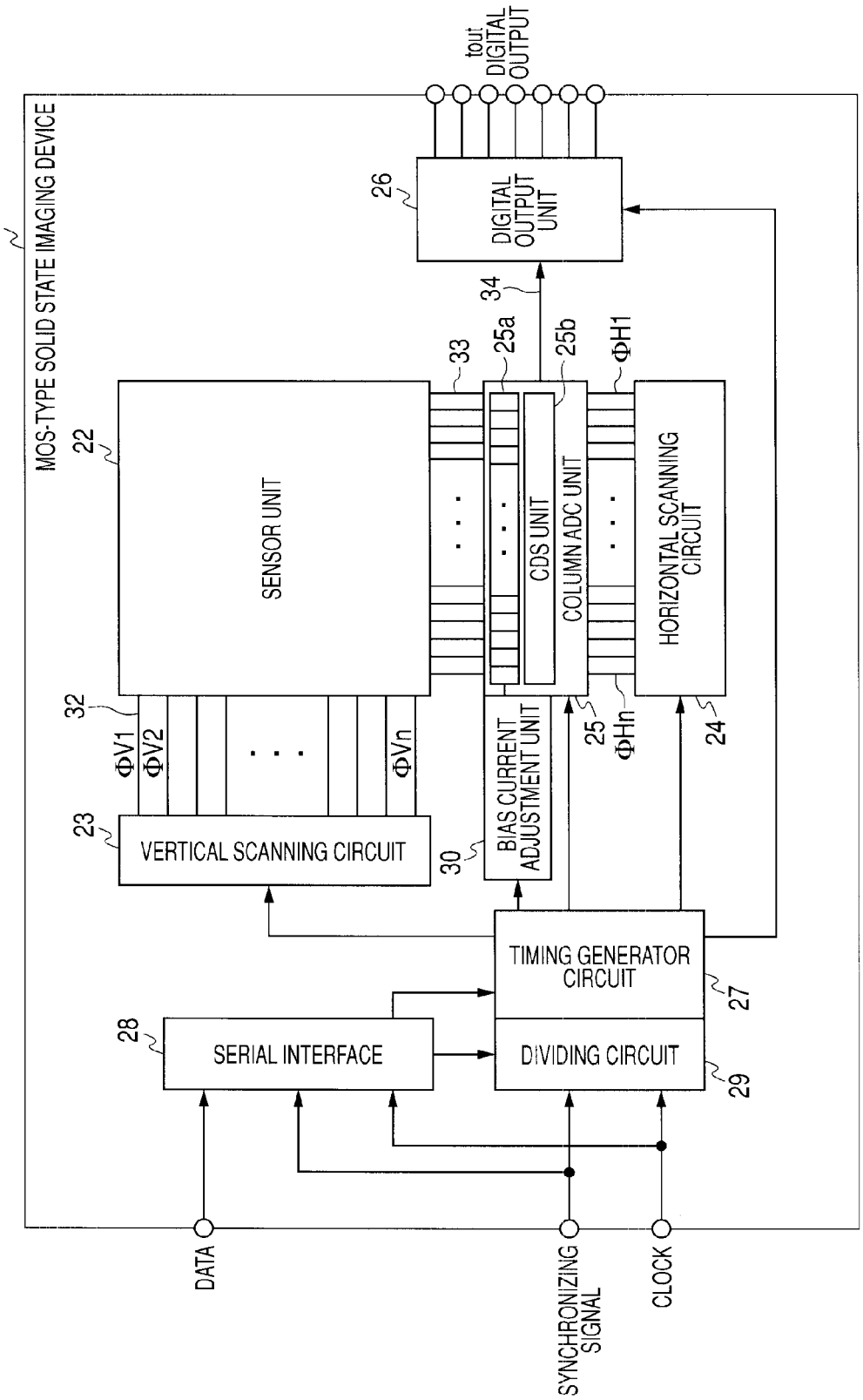
FIG. 1 is a configuration diagram showing a solid-state imaging device according to a first embodiment of the invention.

FIG. 1 is a configuration diagram showing a solid-state imaging device, namely, a MOS-type solid-state imaging device according to the first embodiment of the invention.

A MOS-type solid-state imaging device 21 according to the embodiment of the invention includes a sensor unit 22 in which many unit pixels including photodiodes performing photoelectric conversion and MOS switch elements are arranged in a matrix state, a vertical scanning circuit 23 and a horizontal scanning circuit 24 which drive the sensor unit 22, a column ADC unit (corresponds to a signal processing unit) 25 receiving pixel signals of one row outputted to respective vertical signal lines of the sensor unit 22 in parallel, a digital output unit 26 connected to the column ADC unit 25, a timing generator circuit (corresponding to a drive signal generation unit) 27 generating pulses for operating respective units and a serial interface 28, and further includes, a dividing circuit 29 which divides a clock to generate a clock signal for the timing generator circuit 27 based on instruction data inputted in the serial interface 28 and a bias current adjustment unit 30 controlling the current amount flowing in vertical signal lines 33 of respective columns based on a timing pulse signal outputted from the timing generator circuit 27.

The serial interface 28 and the dividing circuit 29 form an input unit.

In the sensor unit 22, vertical scanning lines 32 from the vertical scanning circuit 23 are commonly connected to pixels of each row and vertical scanning pulses $\phi V$ [$\phi V1, \phi V2, \ldots \phi Vn$] are supplied to pixels of respective rows from the vertical scanning circuit 23 through the vertical scanning lines 32. Further, vertical signal lines 33 are commonly connected to pixels of each column in the sensor unit 22, and respective vertical signal lines 33 are connected to a horizontal signal line 34 through the column ADC unit 25. The horizontal signal line 34 is connected to the input side of the digital output unit 26. Horizontal switching elements are provided corresponding to respective pixel columns in the column ADC unit 25, and horizontal scanning pulses φH [φH1, φH2, . . . φHn] are supplied to the horizontal switching elements from the horizontal scanning circuit 24.

The column ADC unit 25 includes column amplifier units 25a provided to respective vertical signal lines 33 corresponding to columns of the sensor unit 22, amplifying signal charges read out to the vertical signal lines 33 as well as controlling the current amount flowing in the vertical signal lines 33 of respective columns by bias current supplied from the bias current adjustment unit 30 according to operation modes, CDS (Correlated Double Sampling) units 25b provided to respective columns and performing noise removal by finding the difference between the reset level and the signal level of respective pixels, an AGC (Auto Gain Control) function and an analog/digital (A/D) conversion function, in which pixel signals converted into digital amounts in the column ADC unit 25 are transferred to the digital output unit 26 at high speed by the horizontal scanning circuit 24 to be outputted.

Serial data is inputted to the serial interface 28 from the outside. The serial data is data which prescribes drive modes of the sensor unit 22 which will be described later. To the serial interface 28 and the dividing circuit 29, a synchronizing signal and a clock signal are inputted, for example, from the outside.

The timing generator circuit 27 is formed so as to generate timing pulses of plural drive modes corresponding to plural drive mode described later. Necessary pulses for operating respective units of the vertical scanning circuit 23, the horizontal scanning circuit 24, the column ADC unit 25, the digital output unit 26 and the bias current adjustment unit 30 are supplied from the timing generator circuit 27. The dividing circuit 29 is formed so as to divide a clock signal according to instructions from the serial interface unit 28 to be inputted in the timing generator circuit 27. Instructions of the serial interface 28 are inputted to the dividing circuit 29 and the timing generator circuit 27. The bias current adjustment unit 30 entirely changes bias current applied to the column amplifier units 25a according to plural drive modes, thereby controlling current flowing in the vertical signal lines 33 of respective columns.

Next, the operation of the MOS-type solid-state imaging device 21 according to the embodiment will be explained.

Serial data according to drive modes of the sensor unit 22 is inputted into the serial interface 28 to perform mode selection. The data according to the drive mode is decoded in the serial interface 28 and inputted into the dividing circuit 29 and the timing generator circuit 27. The dividing circuit 29 divides the clock signal inputted, for example, from the outside according to the instruction (instruction based on the selected drive mode) from the serial interface 28 and inputs the divided clock signal to the timing generator circuit 27 by synchronizing it with the synchronizing signal.

The timing generator circuit 27 receives the clock signal from the dividing circuit 29 and data from the serial interface 28 and generates timing pulses according to the selected drive mode to input them into respective units of the vertical scanning circuit 23, the horizontal scanning circuit 24, the column ADC circuit 25, the digital output unit 26 and the bias current adjustment circuit 30.

The bias current adjustment circuit 30 entirely switches bias current supplied to column amplifier units 25a provided at each vertical signal line 33 of the column ADC unit 25 according to the operation mode, thereby controlling current flowing in the vertical signal lines 33 of respective columns. The gain of the column amplifier units 25a may be a positive gain or a negative gain, and in the case of the negative gain, for example, a source follower circuit in pixels is an example. In addition, switching of bias current with respect to the column amplifier units 25a is performed during a reading period, namely, a horizontal blanking period in one horizontal period.

The clock signal divided according to the drive mode based on the instruction from the serial interface 28 is supplied from the timing generator circuit 27 to the bias current adjustment unit 30. Particularly in the case of drive mode in which a drive frequency is high, bias current supplied from the bias current adjustment unit 30 to the column amplifier units 25a of respective columns is switched to bias current having a value according to the drive mode in which the drive frequency is high. Accordingly, sufficient current flows in the vertical signal lines 33 and high speed transfer such as 240 fps can be realized.

Through large current is necessary at the time of high-speed transfer, large current is necessary only at the time of start of transfer. It is possible to switch bias current at the timing such that large current is applied during transfer, for example, for a half of the transfer time, and that half current thereof is applied for the rest of time, thereby realizing high-speed transfer and low power consumption at the same time.

In a low-speed drive mode, there is sufficient settling time, therefore, bias current to the column amplifier units 25a can be switched to lower current by the bias current adjustment unit 30 in the same way, thereby reducing power consumption in the column amplifier units.

The sensor unit 22 is driven by the vertical scanning circuit 23. That is, a row of pixels is selected by the vertical selection pulse φV selected according to the drive mode from the vertical scanning circuit 23 and pixel signals of the selected one row are outputted to the column ADC unit 25 through the vertical signal line 33. In the column ADC unit 25, correlated double sampling is performed at the CDS unit 25b, receiving the signals of one row, and signals obtained by subtracting offset components peculiar to respective pixels (corresponding to fixed-pattern noise) are held. Then, the horizontal switching elements are sequentially turned on by the selected horizontal scanning pulse φH from the horizontal scanning circuit 24, pixel signals of one row held in the column ADC unit 25 are A/D converted and read out by the digital output unit 26 through the horizontal signal line 34. The digital output unit 26 converts image signals inputted in serial from the column ADC unit 25 into parallel signals to be outputted from the output terminal $t_{out}$ as digital signals.

The solid-state imaging device 21 shown in the above first embodiment includes column amplifier units 25a provided at respective columns and the bias current adjustment unit 30 adjusting bias current of the amplifier units 25a, changing bias current of the column amplifier units 25a according to plural drive modes by the bias current adjustment unit 30, therefore, low power consumption and speed-up can be realized at the same time.

According to the first embodiment, as low power consumption can be realized, it is possible to prevent generation of heat current and to reduce dark current in the solid-state imaging device. Particularly, when the solid-state imaging device 21 of the embodiment is mounted on portable devices and the like, power consumption can be drastically reduced as well as random noise in the drive mode in which the clock frequency is low can be reduced. Since the random noise can be reduced, image quality in drive modes in the low drive frequency such as a thinning-out mode, a cutting mode, and a low-speed whole pixel readout mode, that is, so-called S/N ratio, dynamic range and the like can be improved.

Next, a specific example of the bias current adjustment unit adjusting bias current of the column amplifier units 25a provided at respective columns will be explained with reference to FIG. 2 and FIG. 3.

Figure 2:
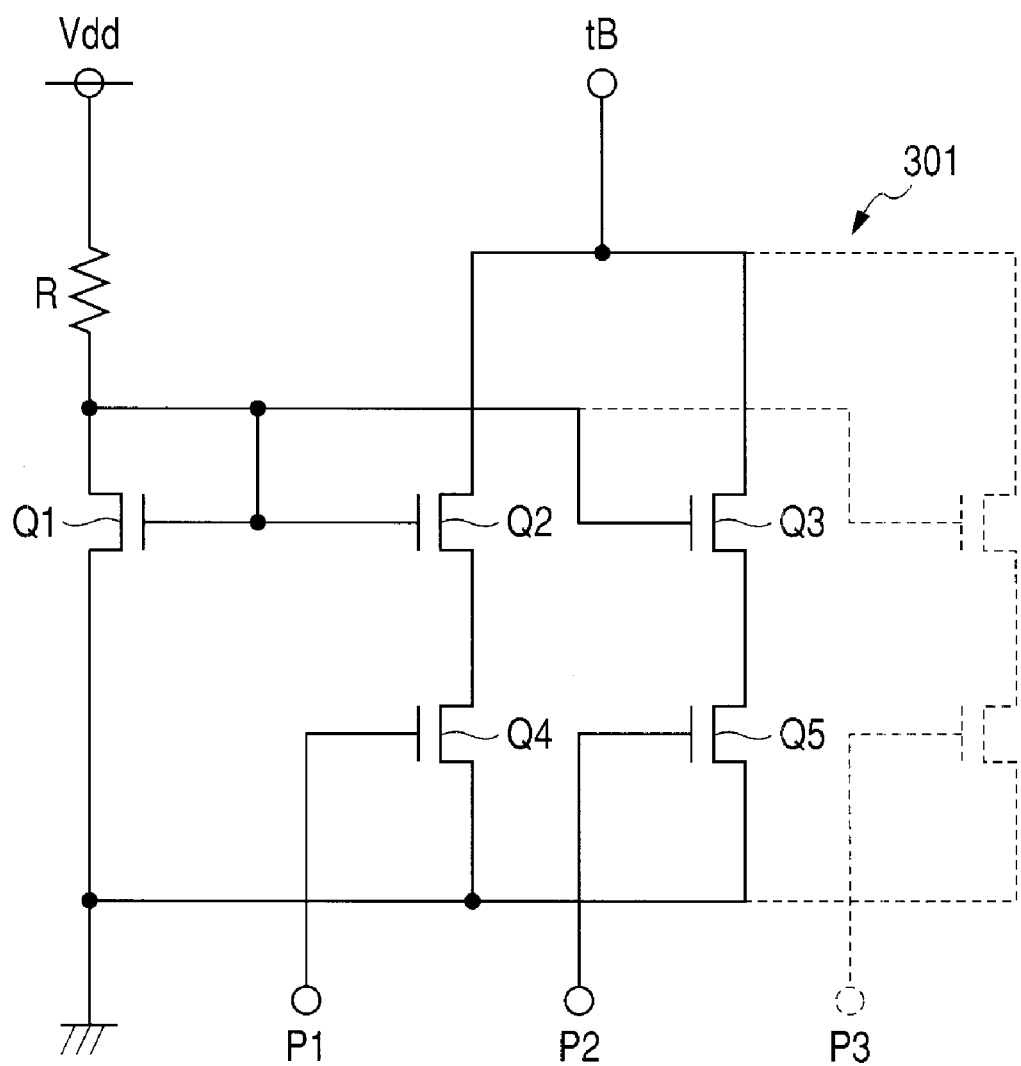
FIG. 2 is a circuit diagram showing an example of a bias current adjustment unit applied to the solid-state imaging device according to an embodiment of the invention.

A bias current adjustment unit 301 shown in FIG. 2 is formed by applying a current mirror circuit. The bias current adjustment unit 301 includes first, second and third MOS transistors Q1, Q2 and Q3, one main electrode of the first MOS transistor Q1 is connected to a power supply Vdd through a resistance R which is a constant current source, respective gate electrodes of the first, second, and third MOS transistors Q1, Q2 and Q3 are commonly connected to one another, and the midpoint between the one main electrode of the first MOS transistor Q1 and the resistance R is connected to gate electrodes of respective MOS transistor Q1, Q2 and Q3. The other main electrode of the second MOS transistor Q2 is connected in series to one main electrode of a MOS transistor Q4 for a first switch, and the other main electrode of the third MOS transistor Q3 is connected in series to one main electrode of a MOS transistor Q5 for a second switch. The respective other main electrodes of the MOS transistors Q4, Q5 for the first and second switches and the other main electrode of the first MOS transistor Q1 are grounded, and one main electrodes of the second and third MOS transistors Q2, Q3 are commonly connected to be connected to a bias current output terminal tB. In the example, a selection signal P1 is supplied from the timing generator circuit 27 to a gate electrode of the MOS transistor Q4 for the first switch, and a selection signal P2 is supplied from the timing generator circuit 27 to a gate electrode of the MOS transistor Q5 for the second switch. The respective selection signals P1, P2 are formed by binary pulses having the high level and the low level, respectively.

The resistance R, the first MOS transistor Q1, the second MOS transistor Q2 and the MOS transistor Q4 for the first switch form a current mirror circuit. Also, the resistance R, the first MOS transistor Q1, the third MOS transistor Q3 and the MOS transistor Q5 for the second switch form a current mirror circuit.

In the bias current adjustment unit 301, current is decided at the resistance R, and the current value is folded at the current mirror circuit to be outputted to the terminal tB as bias current. Four kinds of bias current including current "0" can be outputted by properly combining gate widths of the second and third MOS transistors Q2, Q3. For example, in the case that the gate width of the second MOS transistor Q2 is made to be the same as the gate width of the first MOS transistor Q1, and the gate width of the third MOS transistor Q3 is made to be double of the gate width of the first MOS transistor Q1, a unit of bias current flows when the MOS transistor Q4 for the first switch is turned on, and double bias current flows when the MOS transistor Q4 for the first switch is turned off and the MOS transistor Q5 of the second switch is turned on, and triple bias current flows when the both MOS transistors Q4, Q5 for switches are turned on. Four kinds of bias current can be applied including standby (a state when the both MOS transistors Q4, Q5 for switches are off: bias current "0").

The way of taking the gate width of the MOS transistors Q1, Q2 and Q3 has degree of freedom. According to such circuit configuration, bias current can be changed by properly inputting the selection signals P1, P2 from the timing generator circuit 27, and bias current of the column amplifier units 25a can be switched. When adding a circuit shown by dashed lines in FIG. 2, bias current can be changed to eight kinds of current.

Figure 3:
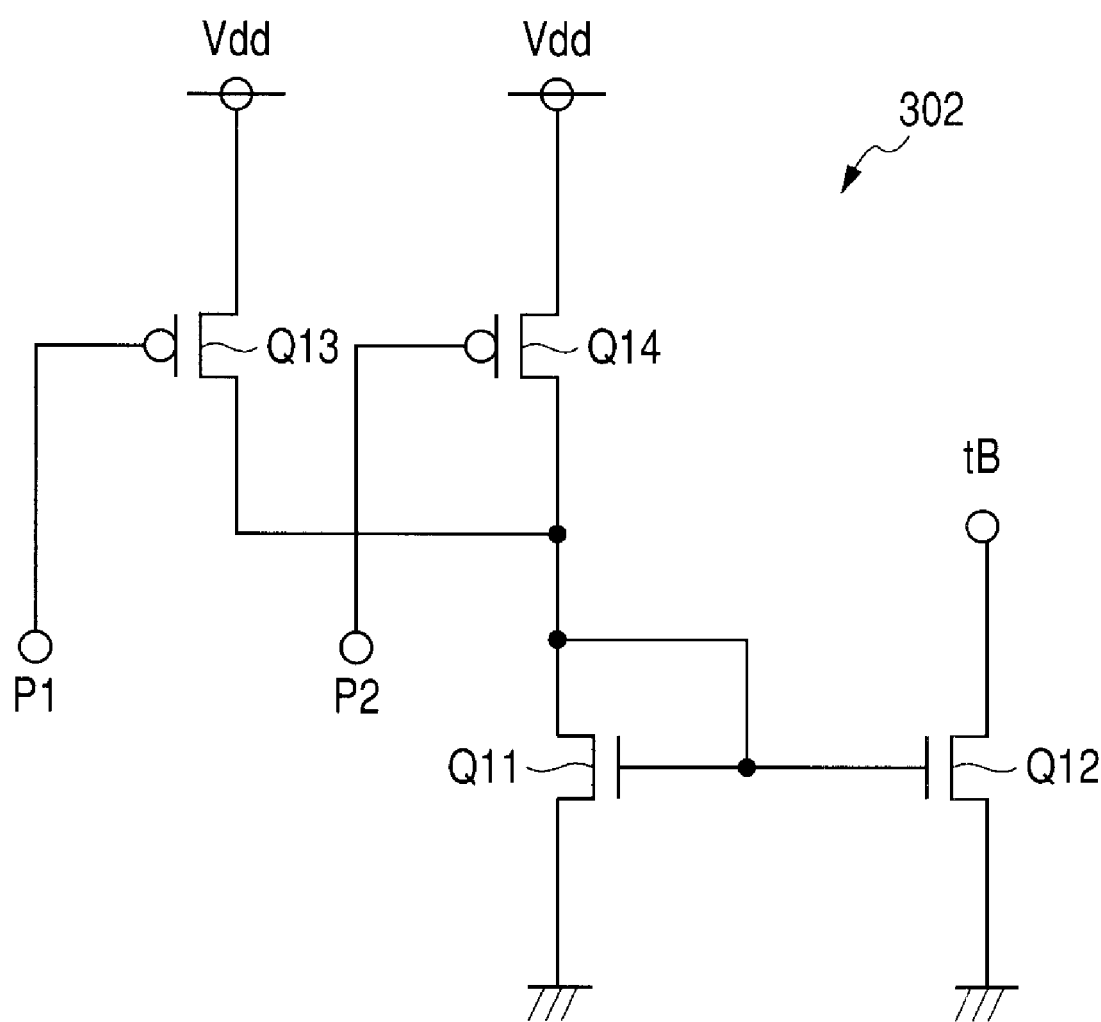
FIG. 3 is a circuit diagram showing another example of a bias current adjustment unit applied to the solid-state imaging device according to an embodiment of the invention.

A bias current adjustment unit 302 shown in FIG. 3 also applies a current mirror circuit. The bias current adjustment unit 302 includes a first n-channel MOS transistor Q11, a second n-channel MOS transistor Q12, further, a first p-channel MOS transistor Q13 and a second p-channel MOS transistor Q14 to be constant current sources. One main electrode of the first MOS transistor Q11 is connected to a power supply VDD through the first and second p-channel MOS transistors Q13, Q14 which are connected in parallel to each other, gate electrodes of the first and second MOS transistors Q11, Q12 are commonly connected to each other, and the midpoint between one main electrode of the first MOS transistor Q11 and the P-channel MOS transistors Q13, Q14 is connected to gate electrodes of both n-channel MOS transistors Q11, Q12. The other main electrodes of the first and second n-channel MOS transistors Q11, Q12 are grounded and one main electrode of the second n-channel MOS transistor Q12 is connected to a bias current output terminal tB. In the example, a selection signal P1 is supplied from the timing generator circuit 27 to the gate electrode of the first p-channel MOS transistor Q13 and a selection signal P2 is supplied from the timing generator circuit 27 to the gate electrode of the second p-channel MOS transistor Q14. The respective selection signal P1 and P2 are formed by binary pulses having the high level and the low level, respectively.

In the bias current adjustment unit 302, current is decided at the p-channel MOS transistors Q13, Q14 in which a threshold is properly adjusted, and the current value is folded at the current mirror circuit to be outputted at the terminal tB as bias current. Then, the gate widths of the first and second p-channel MOS transistors Q13, Q14 are properly set, two kinds of selection signals P1, P2 from the timing generator circuit 27 are selectively inputted to the p-channel MOS transistors Q13, Q14, thereby controlling current flowing in the p-channel MOS transistors Q13, Q14, as a result, current flowing in the second n-channel MOS transistor Q12 will be 2×2=4 kinds, and four kinds of bias current including current "0" can be outputted.

Second Embodiment

Figure 4:
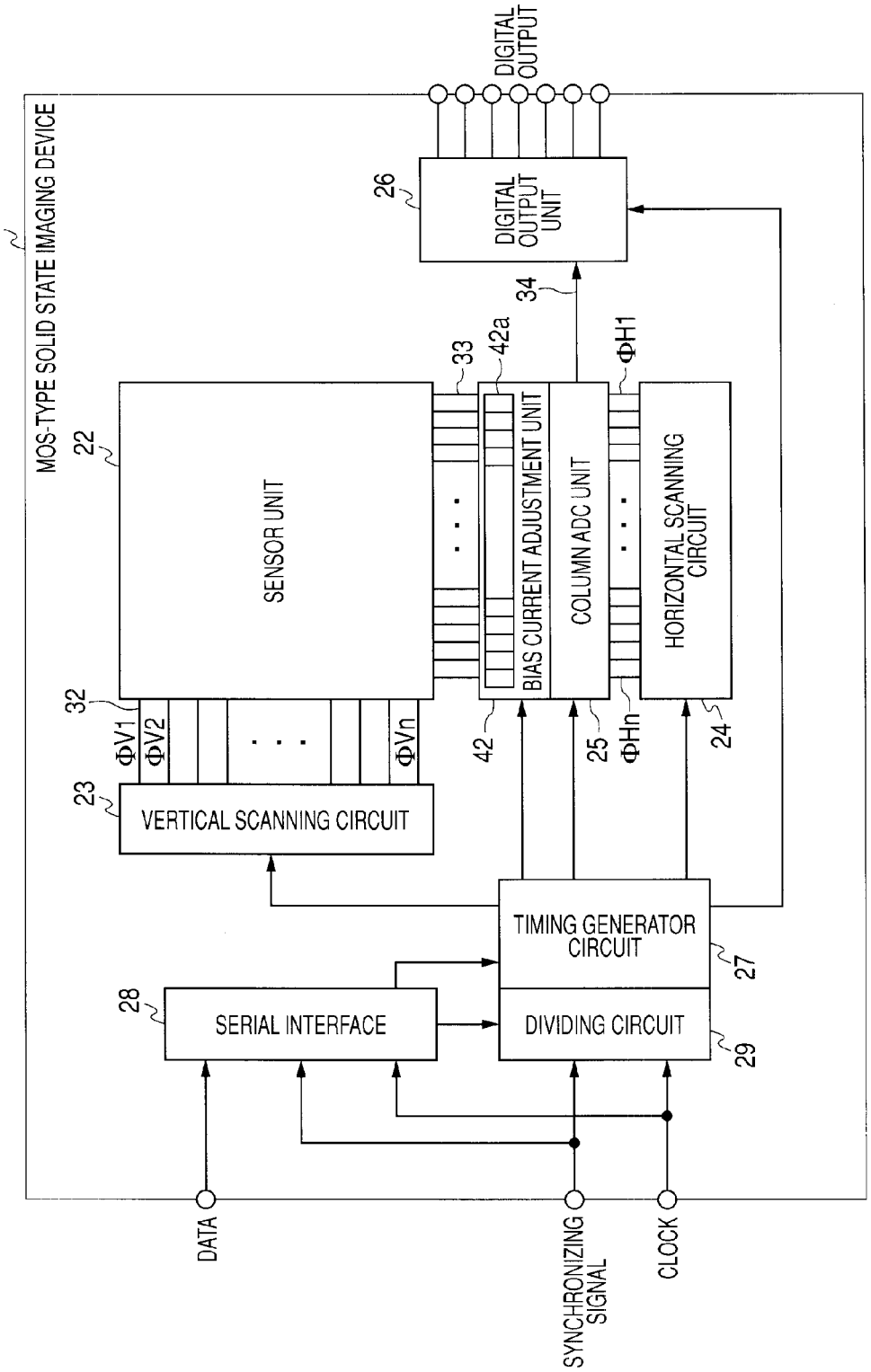
FIG. 4 is a configuration diagram showing a solid-state imaging device according to a second embodiment of the invention.

FIG. 4 is a configuration diagram showing a MOS-type solid-state imaging device according to a second embodiment of the invention.

In a solid-state imaging device 41 shown in the second embodiment, the same numerals and signs are put to components which are the same as the solid-state imaging device 21 of the first embodiment shown in FIG. 1 and the explanation thereof will be omitted. The explanation will be made, focusing on points different from FIG. 1.

The solid-state imaging device 41 shown in the second embodiment is different from FIG. 1 in a point that a bias current adjustment unit 42 is provided, which controls the current amount flowing in vertical signal lines 33 of respective columns separately based on a timing pulse signal from the timing pulse generator circuit 27.

The bias current adjustment unit 42 includes column amplifier units 42a provided at respective vertical signal lines 33 of respective columns and amplifying signal charges read out to the vertical signal lines 33, and bias current applied to the respective column amplifier units 42a is adjusted separately by the bias current adjustment unit 42 which is switched according to a drive mode signal, thereby controlling the current amount flowing in the vertical signal lines 33 of respective columns.

The column ADC unit 25 includes a CDS (Correlated Double Sampling) function provided at respective columns and performing noise removal by finding difference between the reset level and the signal level of respective pixels, an AGC (Auto Gain Control) function and an analog/digital (A/D) conversion function, and pixel signals converted into digital amounts in the column ADC unit 25 are transferred to the digital output unit 26 by the horizontal scanning circuit 24 at high speed to be outputted.

The above solid-state imaging device 41 shown in the second embodiment differs from the first embodiment in the point that bias current applied to the respective column amplifier units 42a is adjusted by the bias current adjustment unit 42 separately, thereby controlling current amounts flowing in the vertical signal lines 33 of respective columns, however, it is the same as the first embodiment in the point that the bias current of the column amplifier units 25a is changed according to the drive mode signal. Therefore, the same operation and effect as the first embodiment can be obtained also in the solid-state imaging device 41 shown in the second embodiment.

Third Embodiment

Next, an example in which the solid-state imaging device shown in the embodiment is applied to an imaging apparatus such as a video camera or a camera built in a cellular phone which is capable of taking moving pictures will be explained with reference to FIG. 5.

Figure 5:
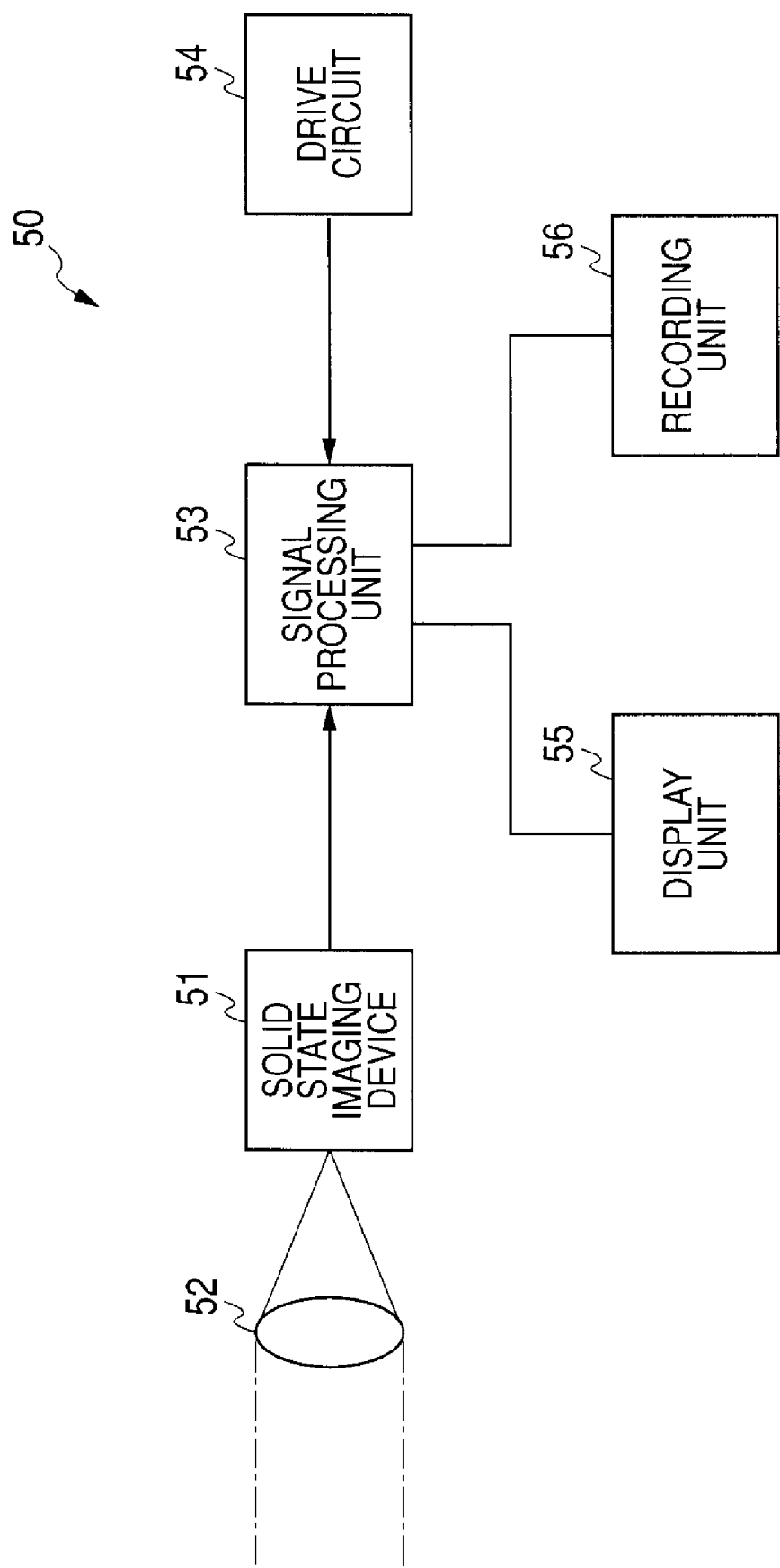
FIG. 5 is a block diagram showing a configuration example of an imaging apparatus using the solid-state imaging device according to an embodiment of the invention.
Figure 6:
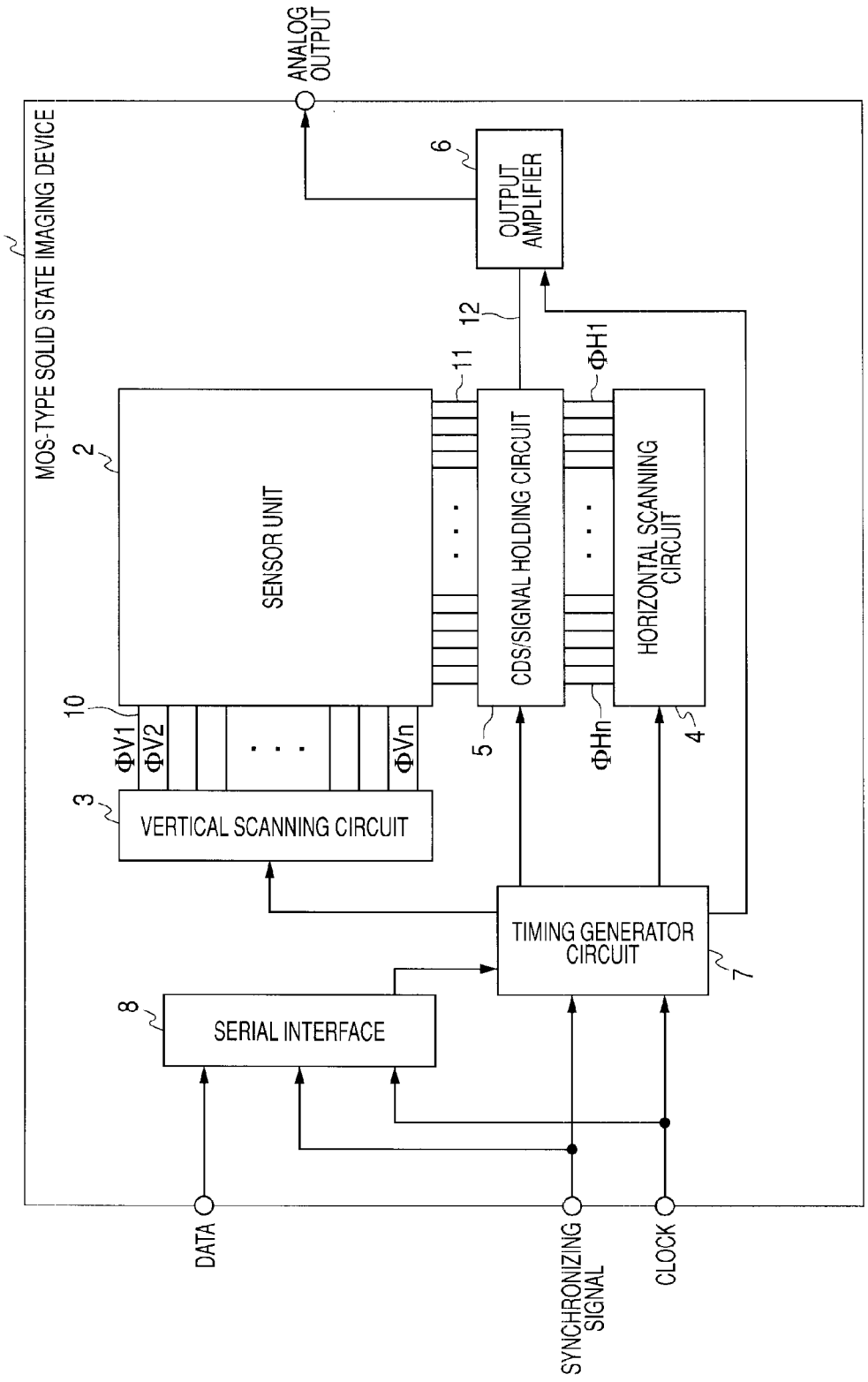
FIG. 6 is a configuration diagram showing a solid-state imaging device in related arts.

In FIG. 5, an imaging apparatus 50 includes a solid-state imaging device 51, an optical system 52 guiding incident light from a subject to the solid-state imaging device 51, a signal processing unit 53 processing output signals from the solid-state imaging device 51, a drive circuit 54 driving the solid-state imaging device 51, a display unit 55 including a liquid crystal display device and the like displaying image data processed by the signal processing unit 53 and a recording unit 56 recording image data processed by the signal processing unit 53 in recording media.

In the imaging apparatus 50, the solid-state imaging devices 51 shown in the respective embodiments are used as the solid-state imaging device 51.

The drive circuit 54 supplies drive signals controlling transfer operation of the solid-state imaging device 51 and shutter operation of a shutter device (not shown) built in the solid-state imaging device 51. Charge transfer of the solid-state imaging device 51 is performed by drive signals (timing signals) supplied from the drive circuit 54. The signal processing unit 53 performs various signal processing. The image data to which signal processing was performed is stored in the storage media in the recording unit 56 and outputted to the display unit 55 to be displayed as images.

According to such imaging apparatus, low power consumption and speed-up can be realized at the same time by using the solid-state imaging device according to the above embodiments as well as generation of heat current can be prevented and dark current in the solid-state imaging device can be reduced because the low power consumption is realized, as a result, imaging pictures having high image quality can be obtained and the imaging apparatus of high image quality can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a sensor unit in which plural pixels are arranged;
a vertical scanning unit and a horizontal scanning unit scanning pixels in the sensor unit;
column amplifier units provided at respective vertical signal lines corresponding to columns in the sensor unit and amplifying signal charges read out to the vertical signal lines, the column amplifier units being capable of providing positive gains and negative gains for each of the columns;
a bias current adjustment unit controlling current flowing in the vertical signal lines by changing bias current of the column amplifier units;
a signal processing unit processing signal charges read out to the vertical signal lines and amplified by the column amplifier units into image signals to be output;
an output unit to which signals output from the signal processing unit are supplied;
a drive signal generation unit supplying drive signals to the vertical scanning unit, the horizontal scanning unit, the signal processing unit and the output unit; and
an input unit supplying plural drive mode signals to the drive signal generation unit, and
wherein,
current flowing in the vertical signal lines is controlled by changing bias current supplied from the bias current adjustment unit to the column amplifier units by drive signals output from the drive signal generation unit according to the plural drive mode signals, and
an increased current flows in the vertical signal lines for a first half of a transfer time and a reduced current flows in the vertical signal lines for a second half of the transfer time.

2. The solid-state imaging device according to claim 1, wherein the signal processing unit includes a CDS function performing noise removal by finding the difference between the reset level and the signal level of respective pixels, an AGC function and an analog/digital (A/D) conversion function.

3. The solid-state imaging device according to claim 1, wherein a pixel signal converted into a digital amount in the signal processing unit is transferred to the output unit at high speed by the horizontal scanning unit.

4. The solid-state imaging device according to claim 1, wherein the bias current adjustment unit controls the column amplifier units by each column, or controls all columns entirely.

5. The solid-state imaging device according to claim 1, wherein the switching of bias current to the column amplifier units by the bias current adjustment unit is performed during the transfer time.

6. An imaging apparatus comprising:
a solid-state imaging device capable of imaging a subject;
imaging optical system guiding incident light from the subject to the solid-state imaging device; and
a signal processing unit processing output signals from the solid-state imaging device,
wherein,
the solid-state imaging device includes (a) a sensor unit in which plural pixels are arranged, (b) a vertical scanning unit and a horizontal scanning unit scanning pixels in the sensor unit, (c) column amplifier units provided at respective vertical signal lines corresponding to columns in the sensor unit and amplifying signal charges read out to the vertical signal lines, the column amplifier units being capable of providing positive gains and negative gains for each of the columns, (d) a bias current adjustment unit controlling current flowing in the vertical signal lines by changing bias current of the column amplifier unit signal processing unit processing signal charges read out to the vertical signal lines are amplified by the column amplifier units into image signals to be outputted, (e) an output unit to which signals outputted from the signal processing unit are supplied, (f) a drive signal generation unit supplying drive signals to the vertical scanning unit, the horizontal scanning unit, the signal processing unit and the output unit, and (g) an input unit supplying plural drive mode signals to the drive signal generation unit, current flowing in the vertical signal lines is controlled by changing bias current supplied from the bias current adjustment unit to the column amplifier units by drive signals outputted from the drive signal generation unit according to the plural drive mode signals, and an increased current flows in the vertical signal lines for a first half of a transfer time and a reduced current flows in the vertical signal lines for a second half of the transfer time.

7. The imaging apparatus according to claim 6,
wherein the signal processing unit includes a CDS function performing noise removal by finding the difference between the reset level and the signal level of respective pixels, an AGC function and an analog/digital (A/D) conversion function.

8. The imaging apparatus according to claim 6,
wherein a pixel signal converted into a digital amount in the signal processing unit is transferred to the output unit at high speed by the horizontal scanning unit.

9. The imaging apparatus according to claim 6,
wherein the bias current adjustment unit controls the column amplifier units by each column, or controls all columns entirely.

* * * * *